Aug. 20, 1968  C. B. ASKE, JR  3,397,917
VEHICLE WHEEL TRIM
Filed Sept. 6, 1966  3 Sheets-Sheet 1
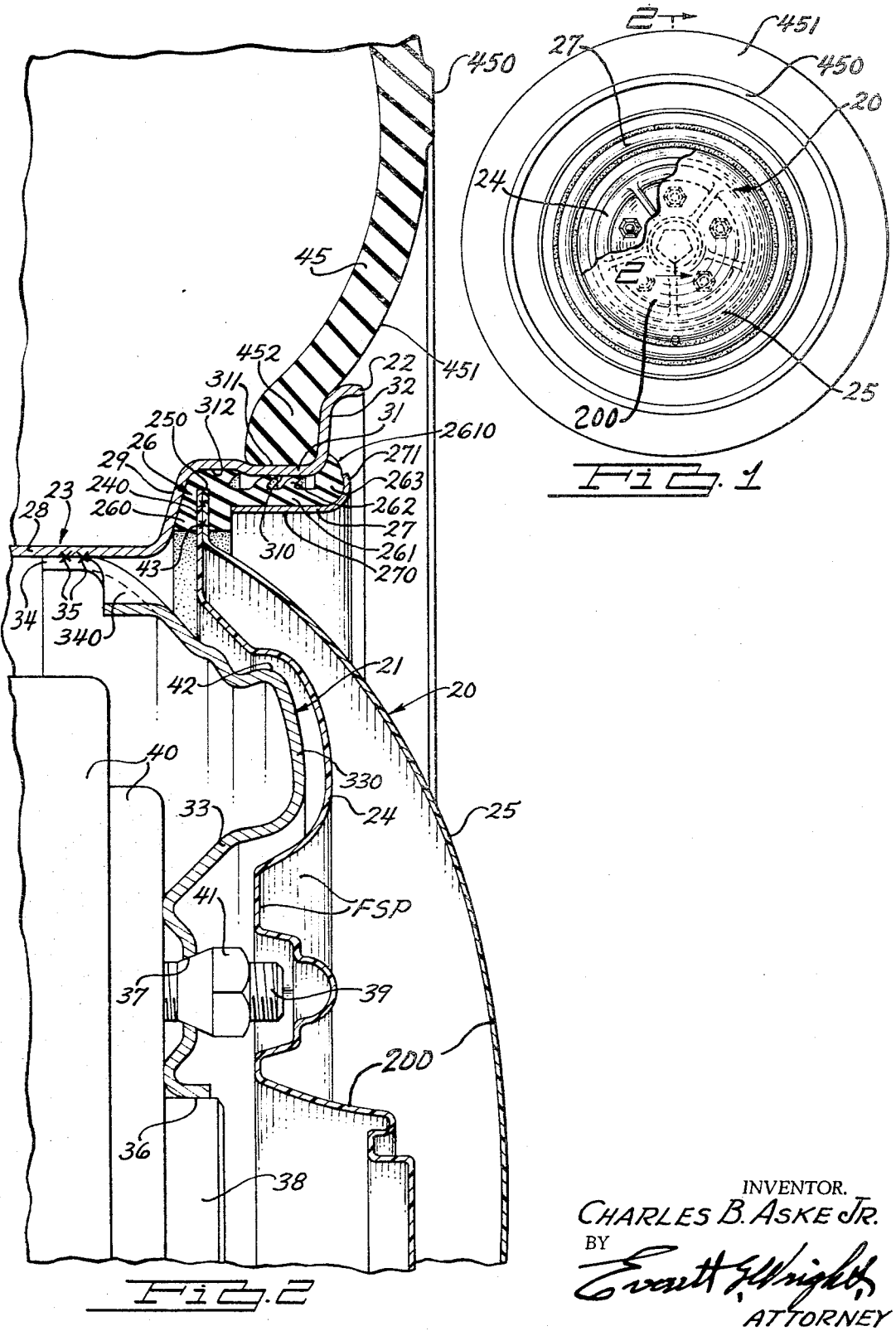
INVENTOR.
CHARLES B. ASKE JR.
BY
Everett E. Wright
ATTORNEY Aug. 20, 1968     C. B. ASKE, JR     3,397,917

VEHICLE WHEEL TRIM

Filed Sept. 6, 1966     3 Sheets-Sheet 2

INVENTOR.
CHARLES B. ASKE JR.
BY
ATTORNEY

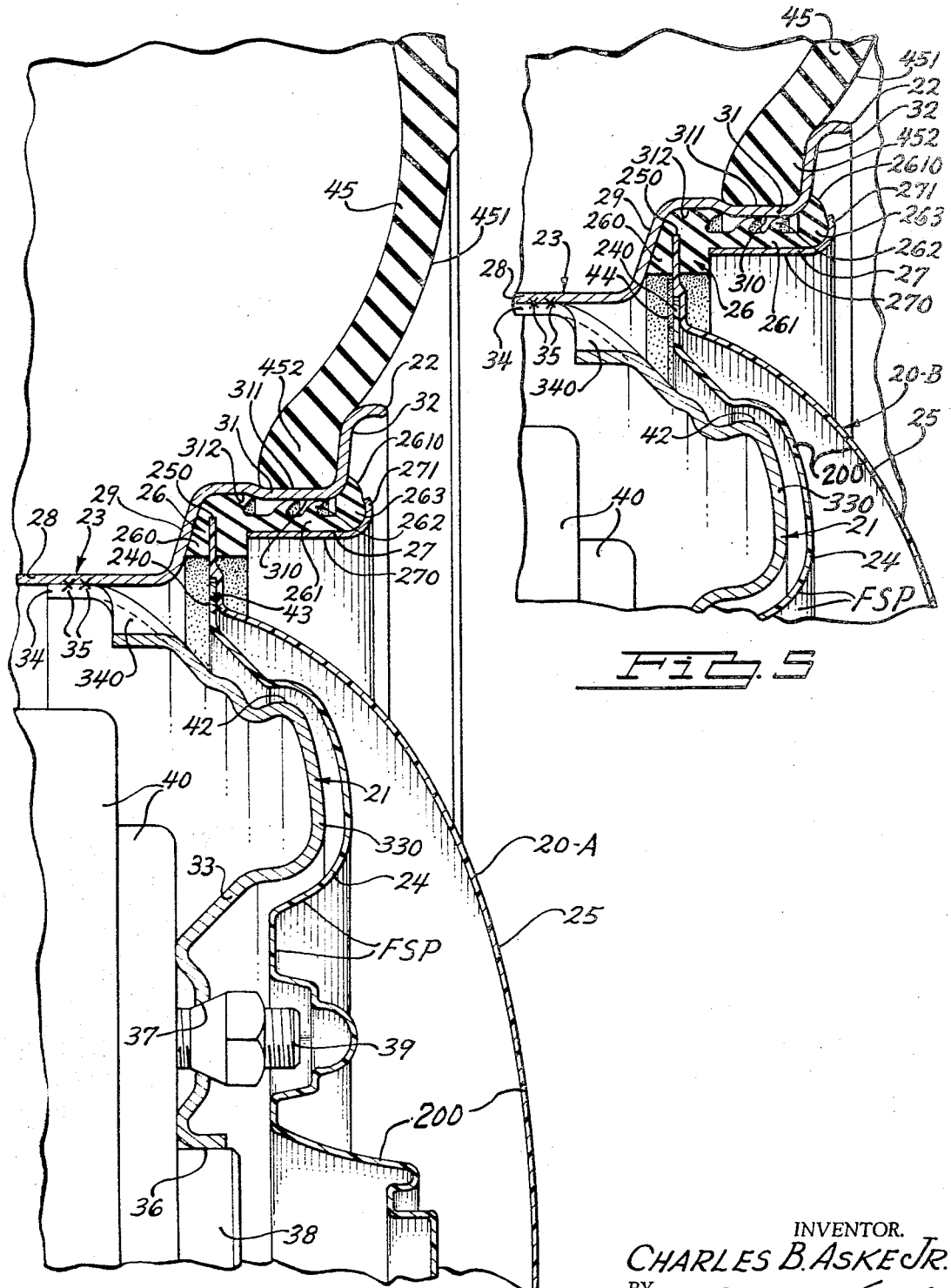

United States Patent Office 3,397,917
Patented Aug. 20, 1968

3,397,917
VEHICLE WHEEL TRIM
Charles B. Aske, Jr., Birmingham, Mich., assignor, by direct and mesne assignments, to Gar Wood Industries, Inc., a corporation of Michigan
Filed Sept. 6, 1966, Ser. No. 577,494
6 Claims. (Cl. 301—37)

ABSTRACT OF THE DISCLOSURE

A vehicle wheel trim for conventional vehicle wheels having a drop center wheel rim including an axially extending tire bead seat forming a tire bead seat annulus with an axially inner well therein, said vehicle wheel trim consisting of a wheel cover assembly including an inner relatively high reflectance wheel trim element space with respect to each other except at their radially disposed peripheral flanges where they are secured together, and means mounting said wheel cover assembly to said vehicle wheel including an annular resilient means having a radially inwardly disposed circumferential slot therein receiving the radially disposed axial periphery of said wheel cover assembly supporting and anchoring said wheel cover assembly concentrically in the said tire bead seat annulus of said vehicle wheel.

---

This invention relates to improved vehicle wheel trim construction consisting of a transparent outer disc or dome of plastic either clear or preferably of a selected color coupled with an inner ornamental patterned disc preferably of an opaque or deeply colored plastic or other material having a reflecting quality and preferably but not necessarily of a color different than that of the outer disc or dome. The combination of the inner reflective patterned disc with an outer transparent colored dome provides a highly desirable ornamental wheel trim of color, reflectance and design heretofore unobtainable in conventional wheel trim construction. The said improved vehicle wheel trim construction includes means for readily and positively removably securing it to a modern vehicle wheel concentric in respect thereto and in a manner to allow and compensate for the differential in expansion between the wheel trim and the vehicle wheel upon which the wheel trim is mounted.

The primary object of the invention is to provide an improved vehicle wheel trim comprising inner and outer plastic wheel trim elements suitably assembled or secured together at or adjacent their peripheral flanges substantially into an integral whole, the inner wheel trim element being characterized by its pattern and design and its reflective qualities while the outer wheel trim element is characterized by being of a selected color and of such transparency as to present to view the pattern and design of the inner element in luster and color affected by the selected color of the outer element, and means mounting the said wheel trim or wheel cover on a vehicle wheel engaging the outer peripheral flange of at least one of said plastic trim elements, said mounting means compensating for expansion and contraction of said plastic wheel trim elements whereby to prevent breakage or cracking of said plastic wheel trim elements or excessive loosening thereof occasioned by extremes in temperature changes during use.

Another object of the invention is to provide a vehicle wheel trim as aforesaid including a dual element wheel cover consisting of an axially inner patterned relatively high reflectance element and an outer relatively plain transparent element of a selected color, and resilient means removably securing said wheel cover to the tire bead seat annulus of the rim of the vehicle wheel, said resilient securing means including rim trim means.

A further object of the invention is to provide an improved vehicle wheel trim for vehicle wheels employing a wheel cover consisting of an inner ornamental plastic disc element of a selected ornamental design and of relatively high reflective qualities with an outer dome or bubble element thereover of a highly transparent colored plastic (preferably red, orange or other warning color) secured together at or near their periphery creating in addition to a novel aesthetic wheel ornamentation including a highly desirable reflectance providing a readily and positively discernible warning signal for motorists approaching directly or angularly from the side of a vehicle equipped therewith; thus including an effective saftey feature in vehicle wheel trim not heretofore able to be accomplished simultaneously with providing a novel and aesthetically desirable wheel trim.

Other objects of the invention will become apparent by reference to the following detailed description taken in connection with the accompanying drawings, in which:

FIG. 1 is a side elevational view of a vehicle wheel having wheel trim embodying the invention mounted thereon.

FIG. 2 is an enlarged fragmentary sectional view taken on the line 2—2 of FIG. 1.

FIG. 4 is an enlarged fragmentary sectional view similar to FIG. 2 showing another embodiment of the invention.

FIG. 5 is a fragmentary sectional view similar to FIG. 4 showing one means for securing together concentrically the inner and outer elements of vehicle wheel trim, thus enabling a customer to select his inner ornamental element and his outer colored transparent element to suit his aesthetic preference and to blend with or accent the color of his car.

Figure 3:
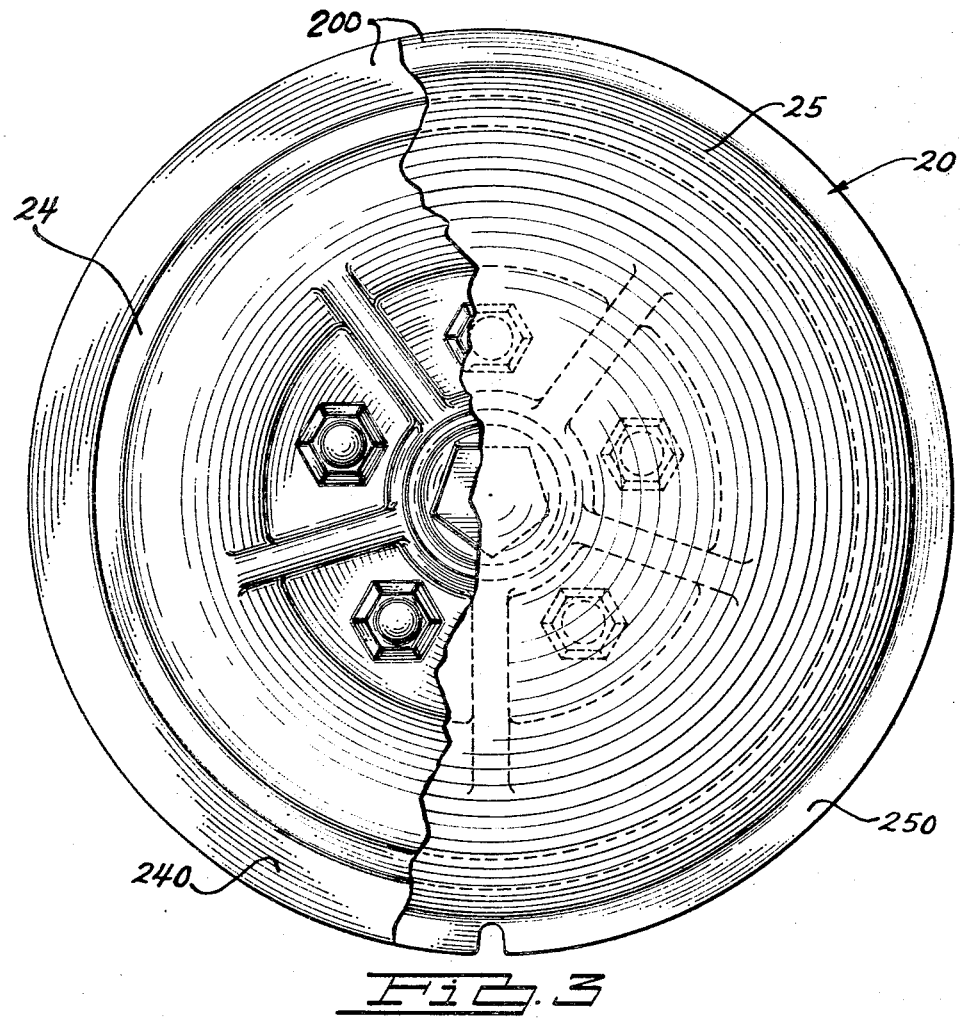
FIG. 3 is an enlarged elevational view of a typical vehicle wheel trim of the invention with a portion of the outer colored transparent element broken away and showing a selected aesthetic design of the inner relatively high reflectance element.

Referring now to the drawings wherein like reference characters refer to like and corresponding parts throughout the several views, vehicle wheel trim 20 of the invention consists of an inner preferably plastic wheel trim element 24 of a selected design and having a substantial degree of reflectance and an outer transparent element 25 of a selected color secured together at their outer radially disposed flanges 240 and 250 respectively forming an ornamental wheel cover 200, and a resilient anchorage means 26 with a cooperating rim trim element 27 removably securing said vehicle wheel trim 20 within the tire bead annulus 310 of the vehicle wheel 21, all as hereinafter described in detail.

The said vehicle wheel 21 has a drop center rim 23 composed of a central channel or drop center 28 having side walls 29 and a base 280. An annular tire bead seat 31 extends laterally outwardly from each of the side walls 29 of the drop center 28, each said tire bead seat 31 preferably having an annular radially outwardly facing tire bead seat pocket 311 formed therein adjacent a tire bead seat flange 32 extending radially outwardly therefrom, the said tire bead seat flange 32 being axially outwardly curved at its upper portion to form an axially disposed outer lip 22. The said tire bead seat flange 32 is ofttimes referred to as the wheel flange, the said lip 22 is ofttimes referred to as the lip of the wheel rim, and the radially inner exposed annular face of the tire bead seat 31 is generally referred to as the tire bead seat annulus 310. The formation of the said tire bead seat pocket 311 in the tire bead seat annulus 310 provides an annular radially inwardly facing tire bead seat anchorage recess 312 which readily is employed to receive the wheel trim anchor portion 260 of the resilient wheel trim securing means 26.

Within the drop center 28 of the drop center rim 23 is a wheel spider 33 having an axially disposed flange 34 which is secured to the base 280 of the drop center 28 of the drop center rim 23 by such means as welding at 35. The said wheel spider 33 is generally provided with a central hub aperture 36 with securing stud holes 37 spaced therearound to accommodate respectively the wheel hub 38 and wheel securing studs 39 extending from the brake drum 40 to which the wheel 21 is secured by means of the usual wheel securing nuts 41.

The flange 34 of the spider 33 is generally scalloped out and formed at 340 at intervals around the periphery thereof to provide brake drum ventilation and added structural strength to the vehicle wheel 21. The spider 33 is generally formed with an annular axially outwardly extending collar 330 which is preferably provided with a plurality of hub cap retainer nubs 42 over which a conventional hub cap (not shown) may be sprung for securement onto the vehicle wheel 21. However, in the instant invention, the hub cap need not be employed.

The particular tire 45 illustrated in the drawings is a tubeless tire having a scuff bead 450 extending from its side wall 451, and the tire side wall 451 terminates in a mounting bead 452 which seats in the said annular tire bead seat pocket 311 formed in the tire bead seat 31 of the wheel rim 23.

Referring now particularly to FIGS. 1, 2 and 3, the wheel cover assembly 200 of the vehicle wheel trim 20 consists of an inner preferably plastic wheel trim element 24 of a selected ornamental design and of a selected color having a relatively high reflectance. The particular design of the inner wheel rim element 24 is shown for illustrative purposes and not limiting, the said indicated design being a spoked artillery wheel simulation with artificial nuts and of a contour to fit in spaced relationship over the conventional wheel spider 33, the wheel hub 38 and the wheel securing studs 39. This wheel trim element 24 may be first surface plated at FSP if an extremely high reflectance is desired; otherwise, it may be of plastic of such selected color and color density as may be preferred.

Over the said inner relatively high reflectance wheel trim element 24 is positioned an outer transparent plastic wheel trim element 25 preferably of a relatively plain design, and is of a considerable or somewhat lighter color than the inner relatively high reflectance element 24. The color and the degree of reflectance of the inner relatively high reflectance wheel trim element 24, and the color and degree of transparency of the outer plastic wheel trim element 25 are each selected to provide the desired aesthetic effect when assembled together.

The inner wheel trim element 24 and the outer wheel trim element 25 are provided with suitable radially outwardly disposed circumferential flanges 240 and 250 which may be secured axially together in any suitable manner preferably employing a chemical adhesive, heat seal or the like. In some instances it may be desirable to secure the inner and outer wheel trim elments 24 and 25 hermetically together, or they may be secured together by spot tacking, either being a matter of choice and depending upon the particular type of wheel with which vehicle wheel trim of the invention is employed.

The annular resilient wheel trim anchorage means 26 includes an annular wheel trim anchorage portion 260 having a radially disposed circumferential slot 261 therein which receives the outer radially disposed circumferential flanges 240 and 250 of the wheel trim elements 24 and 25 forming the wheel cover element 200. This annular wheel trim anchorage portion 260 of the said resilient anchorage means 26 is preferably positioned in the annular tire bead seat trim anchorage pocket 311 of the tire bead seat annulus 310 when vehicle wheel trim of the invention is mounted on a vehicle wheel.

Extending axially outwardly from the said annular wheel trim anchorage portion 260 of the wheel trim anchorage means 26 is an auxiliary axially disposed radially outwardly extending circumferentially toothed anchorage flange portion 261 having a plurality of resilient teeth 262 therein, the said toothed anchorage flange portion 261 terminating axially into a generally bulbous annular bead 263 which is formed to bear against the juncture 320 of the annular tire bead seat 31 and the tire bead seat flange 32.

An annular rim trim element 27 is preferably of stainless steel but may be of other material consists of an annular axially disposed band portion 270 and a generally radially disposed bull nose portion 271. The said band portion 270 of the annular rim trim element 27 is telescoped over the inner periphery of the circumferentially toothed anchorage flange portion 261 of the wheel trim anchorage means 26, and the said bull nose portion 271 covers a portion of the said annular bead 263 preferably leaving an annular band 2610 extending circumferentially and radially outwardly therefrom. This annular band 2610 may serve as a further wheel trim by making the resilient wheel trim anchorage means 26 of a resilient rubber or of a suitable synthetic rubber of a color contrasting to the color of the vehicle wheel trim. The diameter of the band portion 270 of the annular rim trim element 27 is such as to back up the said toothed anchorage flange portion 261 of the wheel trim anchorage means 26 and maintain it in the proper diameter for its removable securement to the tire bead seat annulus 310 of the vehicle wheel 21 when vehicle wheel trim of the invention is mounted on the vehicle wheel.

The embodiments of the invention 20–A and 20–B shown in FIGS. 4 and 5 are like and similar to that shown in FIGS. 1, 2 and 3 except that the circumferential flanges 240 and 250 have been offset preferably as shown in FIGS. 4 and 5. In FIG. 4, the flanges 240 and 250 are indicated permanently fixed together in the embodiment 20–A at 43, whereas in FIG. 5 they are removably fixed together in the embodiment 20–B by such means as a suitable adhesive tape or the like 44. By employing a tape or the like 44 for removable securement, the purchaser can select any available wheel trim design at the time of purchase, or later in the event the purchaser is desirous of transferring his wheel trim from one vehicle to the other. However, in the construction shown in FIGS. 4 and 5, the flanges 240 and 250 also may be secured together by means of a suitable plastic cement or the like to provide a permanently sealed wheel cover unit.

Although but several embodiments of the invention have been disclosed and described in detail, it is obvious that many changes may be made in the size, shape, arrangement and details of the various elements thereof, all without departing from the spirit and scope of the invention as defined by the appended claims.

I claim:
1. In a vehicle wheel trim for a vehicle wheel of the type including a wheel spider and a drop center wheel rim thereon having an axially outwardly extending tire bead seat forming a tire bead seat annulus with an axially inner annular well therein comprising, in combination,
   a vehicle wheel cover assembly including an inner relatively high reflectance wheel trim element of one selected color and an outer transparent wheel trim element of a second selected color having mating radially disposed peripheral flanges, said inner and outer wheel trim elements being spaced except at their mating peripheral flanges,
   means securing said inner and outer wheel cover elements together at their peripheral flanges, and
   annular resilient means having a radially inwardly disposed circumferential slot therein receiving the outer periphery of said wheel cover assembly supporting and anchoring said wheel cover assembly concentrically in said tire bead seat annulus of said vehicle wheel.

2. A vehicle wheel trim as claimed in claim 1 wherein said inner relatively high reflective rim trim element of the wheel cover assembly is first surface plated.

3. A vehicle wheel trim as claimed in claim 1 wherein said annual resilient supporting and anchorage means is of substantial thickness and resiliency at said well formed in said tire bead seat annulus and is disposed over and engages at least one of said radially disposed peripheral flanges of said wheel cover assembly, said resilient supporting means being such as to allow for differentials in thermal expansion and/or contraction of the vehicle wheel and said wheel cover assembly.

4. A vehicle wheel trim as claimed in claim 1 wherein the outer radially disposed peripheral flange of the outer transparent wheel trim element of the said wheel cover assembly is axially offset to matingly accommodate the outer peripheral flange of said inner relatively high reflectance wheel trim.

5. A vehicle wheel trim as claimed in claim 1 wherein said resilient anchorage means has an axially outwardly disposed circumferentially toothed annular anchorage band terminating in a generally bulbous axially outer rib, and a rim trim element telescoped over said toothed anchorage band sized to hold said resilient anchorge means in removably locked relationship within the tire bead seat annulus of said wheel rim and formed to encompass a substantial portion of said bulbous axially outer rib when said vehicle wheel trim is assembled and axially mounted on said vehicle wheel.

6. A vehicle wheel trim as claimed in claim 5 wherein the resilient anchorage means is of a color other than black and the colors employed in the inner and outer wheel trim elements of said wheel cover whereby to provide a circumferential accent stripe radially outwardly of said rim trim element.

References Cited
UNITED STATES PATENTS

| | | |
|---|---|---|
| 2,593,274 | 4/1952 | Dandurand. |
| 2,657,099 | 10/1953 | Judd _____ 301—37 |
| 2,757,978 | 8/1956 | Lyon _____ 301—37 |
| 2,812,215 | 11/1957 | Waite _____ 301—37 |
| 2,902,316 | 9/1959 | Black _____ 301—37 |
| 3,155,430 | 11/1964 | Schindler _____ 301—37 |
| 3,178,231 | 4/1965 | Hezler _____ 301—37 |

RICHARD J. JOHNSON, *Primary Examiner.*